United States Patent Office 3,506,217
Patented Apr. 14, 1970

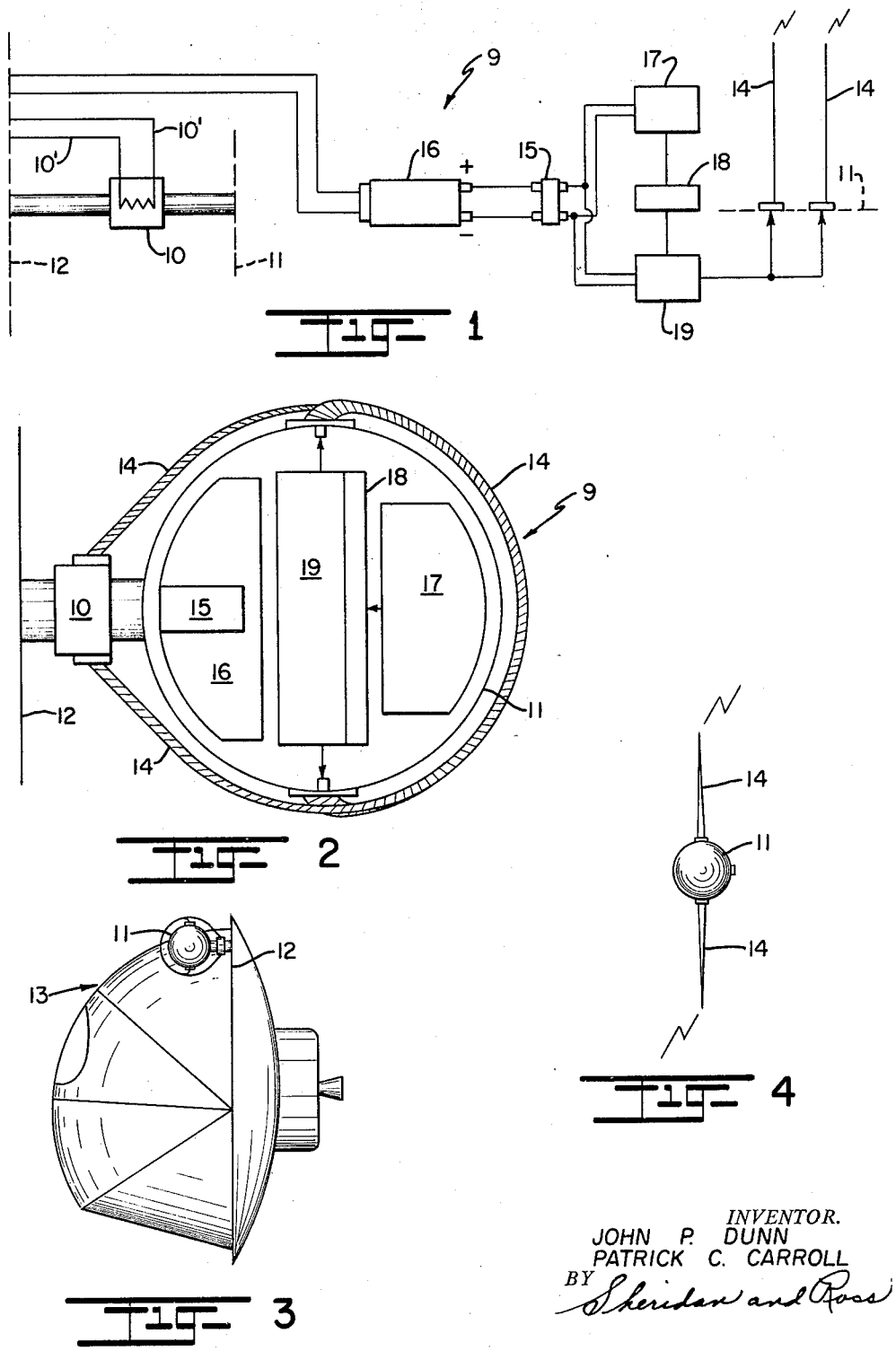

3,506,217
METHOD AND APPARATUS FOR DETERMINING THE TIME AND LOCATION OF OCCURRENCE OF EVENTS OCCURRING IN SPACE
John P. Dunn, Elbert, and Patrick C. Carroll, Littleton, Colo., assignors to Martin-Marietta Corporation, New York, N.Y., a corporation of Maryland
Continuation of application Ser. No. 466,537, June 24, 1965. This application Dec. 19, 1967, Ser. No. 705,873
Int. Cl. B64g 1/00
U.S. Cl. 244—1
9 Claims

ABSTRACT OF THE DISCLOSURE

The system comprises a beacon transmitting vehicle carried by a spacecraft in a predetermined orbit. Means are provided for launching the beacon vehicle from the spacecraft into the orbit of the spacecraft when the spacecraft leaves the orbit. The launched beacon vehicle begins transmitting encoded signals to ground tracking station indicating the time elapsed since the spacecraft left the orbit. The beacon vehicle continues to transmit signals from the orbit to assure that the ground tracking stations will pick up the transmitted information. This information provides the time and location of the spacecraft when it left the orbit. With this information, the ground tracking stations can, for example, determine the approximate landing location of the spacecraft on earth in the case of an emergency escape.

---

This application is a continuation of application Ser. No. 466,537, filed June 24, 1965, now abandoned.

This invention relates to a system and a method for determining the time and location in an orbit at which an event has occurred on an orbiting space vehicle.

Events occurring in a space vehicle, such as a satellite, frequently are not observable by ground tracking stations. Examples of such events are the separation of a space probe from an orbiting vehicle and the firing of retrothrust rockets for return of the vehicle to earth. In the latter event, the time and position of the firing of the retrothrust rockets should be accurately known so that the landing time and place can accurately be determined with maximum speed.

Accordingly, it is a primary object of this invention to provide a system for accurately and promptly communicating to earth the time and position in an orbit in space at which an event has occurred in an orbiting space vehicle.

Another object of this invention is to provide a satellite timing beacon for communicating signals to earth from a vehicle in a space orbit upon the occurrence of a predetermined event on the vehicle.

Additional objects of the invention will become apparent from the following description, which is given primarily for purposes of illustration, and not limitation.

Stated in general terms, the objects of the invention have been attained by providing a beacon or signal transmitting system which is separated by any suitable means from the orbiting space vehicle at the instant the predetermined event on the vehicle is initiated. A timing means in the system is simultaneously initiated. The beacon signals to earth the time elapsed since initiation of the event, and is located by ground radar so that its position is determined. With this knowledge, the knowledge of the orbit, the velocity and the time the beacon has been traveling in its orbit since the instant of initiation of the predetermined event, a backward projection in time and space is made to accurately locate the time and position of the vehicle at the instant the predetermined event took place.

A more detailed description of a specific embodiment of the invention, as applied to an emergency global rescue escape and survival system, is given below with reference to the accompanying drawings, wherein:

FIG. 1 is a schematic diagram showing a space vehicle timing beacon as mounted on the space vehicle prior to the initiation of a predetermined event on the vehicle while orbiting in space;

FIG. 2 is a schematic diagram showing the internal arrangement of elements of the timing beacon of FIG. 1 prior to the initiation of the predetermined event;

FIG. 3 is a diagrammatic side elevational view showing the timing beacon of FIGS. 1 and 2 mounted on an escape capsule; and FIG. 4 is a side elevational view showing the timing beacon of FIGS. 1 to 3 separated from the space vehicle and in orbit for transmission of encoded time elapse signals to earth after the happening of the predetermined event on the space vehicle.

The timing beacon transmitting apparatus, represented generally by the numeral 9, includes a battery, radio transmitter, transmitter antennas, a clock or timer device, timer signal encoder and an acceleration switch, with associated wiring and hardware, all installed in a case. An associated pyrotechnic device is provided for launching the apparatus from a space vehicle. The detailed construction of the inventive features of the device will now be described in conjunction with the drawings wherein like parts are represented by like numerals.

In the specific example illustrated in the drawings, operation of the system is initiated the instant the astronaut presses the retrothrust button. Pressing the button fires a pyrotechnic separation device 10 of conventional type used in the art, through conductors 10' connecting the separation device to a power source (not shown). Firing of pyrotechnic device 10 separates the beacon unit enclosed in housing or case 11 (FIG. 2) from its mounting at 12 on the orbiting space vehicle or capsule 13 (FIG. 3). Any suitable conventional separation device can be used.

The force of the resultant separation caused by the firing releases the two transmitter antennas 14. These antennas are flexible and spring from their folded position shown in FIGS. 2 and 3 to their straight, oppositely extended position shown in FIG. 4. Antennas 14 are of conventional design available on the market. Any other suitable antenna means can be used.

The force of the firing of pyrotechnic device 10 and the resultant rapid separation of the beacon system from capsule 13 also closes the acceleration switch 15. Acceleration switch 15 is a standard off-the-shelf component which can be purchased from commercial suppliers. Closing of acceleration switch 15 activates battery 16 of standard type available on the market.

Activation of battery 16 starts the clock timer 17, through the battery circuit and closed switch 15, timer signal encoder 18 and radio transmitter 19, as best shown in FIG. 1. Clock timer 17, signal encoder 18 and radio transmitter 19 are off-the-shelf items which can be obtained from commercial suppliers.

The clock timer 17 begins timing the time elapsed from the instant of firing pyrotechnic device 10 and radio transmitter 19 starts transmitting the time in encoded signals such as pulse code, at one second intervals, for example, for an extended period of time, such as about 7 days. The separated beacon system in housing or case 11 continues in the space orbit of the capsule 13 after separation, whereas the capsule, due to the firing of its retrothrust rockets, has commenced its re-entry trajectory to earth.

Any tracking station, upon receiving the time signals of the beacon system sent from antennas 14, can speedily determine the point in time and space at which the retrothrust occurred. From a determination of this point and other data, as described hereinabove, the re-entry trajectory and landing point of capsule 13 can speedily and accurately be determined. The accuracy of the beacon time, retrothrust alignment and ground calculations permit location of the point of landing of capsule 13 within a circle of about 150 nautical miles radius.

A similar operation is used to determine the point in time and space of an event such as the separation of a space probe from a parking orbit of a space vehicle, for example, as well as the occurrence of other, similar events upon a space vehicle while in a space orbit.

The beacon system can, of course, be used without launching it from the space vehicle to indicate time elapsed since the occurrence of other events on the space vehicle.

Obviously many modifications and variations of the satellite timing system and method of the invention are possible in the light of the teachings given hereinabove. It is, therefore, to be understood that, within the scope of the appended claims, the invention can be practiced otherwise than as specifically described.

What is claimed is:

1. An apparatus for indicating that a spacecraft has departed from a predetermined orbit comprising a beacon vehicle carried by an orbiting spacecraft and having means for transmitting signals including timing means for transmitting encoded signals which continuously indicate the precise time that the spacecraft departed said orbit so that the spacecraft's location in said orbit at time of departure can be determined regardless of when the encoded signals are received, means for launching said beacon vehicle into said predetermined orbit prior to the spacecraft's departure from said orbit, and means for actuating said means for transmitting said signals when the spacecraft departs said orbit.

2. An apparatus as defined in claim 1, wherein said means for transmitting signals comprises clock means operable in response to launching said beacon vehicle for measuring the time elapsed from the launching, encoder means for encoding the elapsed time measured by said clock means, and transmitter means operatively connected to said encoded means for transmitting encoded signals indicating time elapsed since the launching.

3. An apparatus as defined in claim 1, wherein said means for launching said beacon vehicle comprises means for effecting instantaneous separation of said beacon vehicle from the spacecraft at the instant of initiation of firing of the retrothrust rockets of the spacecraft.

4. An apparatus as defined in claim 3, wherein said means for effecting instantaneous separation of said beacon vehicle from said spacecraft includes pyrotechnic means operatively connected to said spacecraft and beacon vehicle.

5. An apparatus as defined in claim 1, wherein said means for actuating said means for transmitting signals includes acceleration sensing means on said beacon vehicle operable upon sensing acceleration of said beacon vehicle relative to said spacecraft to initiate operation of said means for transmitting signals.

6. A beacon system for determining the time and location in an orbit in space at which retrothrust rockets were previously fired on an orbiting space capsule which comprises: in combination, pyrotechnic separation means mounted on the space capsule for effecting instantaneous separation of the beacon system from the capsule at the instant of initiation of the firing of retrothrust rockets and launching it into said orbit, acceleration switch means mounted on the beacon system for closing a beacon circuit at the instant of activation of the pyrotechnic separation means, means coupled with the acceleration switch means for energization of clock means upon closing of the switch means, encoder means coupled with the clock means for encoding the elapsed time measured by the clock means, radio transmitter means coupled with the encoder means for transmission to earth encoded signals conveying the time elapsed after the instant of firing of the retrothrust rockets, and battery means coupled with the switch, clock, encoder and transmitter means for energization thereof.

7. A method for indicating when a spacecraft departs from its predetermined orbit comprising the step of launching a beacon transmitting vehicle from the spacecraft into the predetermined orbit of the spacecraft prior to the spacecraft's departure from said orbit and transmitting encoded signals from the launched beacon vehicle while in said orbit to continuously indicate the time elapsed since the spacecraft departed from said orbit.

8. A method as defined in claim 7, further including launching the beacon vehicle at initiation of the firing of retrothrust rockets of the spacecraft and commence transmitting the encoded signals as the beacon vehicle is launched.

9. A method for determining the time and location of landing of a space capsule returning to earth from an orbit in space which comprises the steps of launching a radio beacon from the space capsule in the orbit of the capsule at initiation of the firing of retrothrust rockets on the space capsule, detecting encoded time signals transmitted to earth from the separated beacon which transmit the time elapsed after said initiation, locating the separated beacon by earth based radar, locating the time and position of the capsule at the instant of firing the retrothrust rockets by a backward projection in time and space based upon the orbit and the time velocity of travel of the beacon in the orbit, and determining the time and location of landing of the capsule on earth based upon the time and position of the capsule at the instant of firing the retrothrust rockets and its trajectory and velocity to earth.

References Cited

UNITED STATES PATENTS

| 3,173,627 | 3/1965 | Cohen | 244—1 |
|-----------|--------|-------|-------|
| 3,246,860 | 4/1966 | Yates. | |

FERGUS S. MIDDLETON, Primary Examiner